(12) United States Patent
Gauthier et al.

(10) Patent No.: US 6,935,696 B2
(45) Date of Patent: Aug. 30, 2005

(54) HEAD RESTRAINT MECHANISM AND METHOD OF MAKING SAME

(75) Inventors: Jeremy J. Gauthier, Kalamazoo, MI (US); Robert R. Sutter, Jr., Belmont, MI (US); Craig A. Ulman, Rockford, MI (US)

(73) Assignee: Gill Industries, Inc., Grand Rapids, MI (US)

( * ) Notice: Subject to any disclaimer, the term of this patent is extended or adjusted under 35 U.S.C. 154(b) by 0 days.

(21) Appl. No.: 10/633,770

(22) Filed: Aug. 4, 2003

(65) Prior Publication Data

US 2005/0029853 A1 Feb. 10, 2005

(51) Int. Cl.[7] .................................................. A47C 1/10
(52) U.S. Cl. ........................ 297/408; 297/403; 297/391
(58) Field of Search ................................ 297/408, 403, 297/391

(56) References Cited

U.S. PATENT DOCUMENTS

| | | | |
|---|---|---|---|
| 4,576,401 A * | 3/1986 | Harrison ..................... 277/615 |
| 4,600,240 A * | 7/1986 | Suman et al. ............... 297/408 |
| 4,682,817 A * | 7/1987 | Freber ........................ 297/408 |
| 4,761,034 A * | 8/1988 | Saito .......................... 297/408 |
| 5,026,120 A * | 6/1991 | Takeda et al. .............. 297/408 |
| 5,145,233 A | 9/1992 | Nagashima |
| 5,181,758 A | 1/1993 | Sandvik |
| 5,590,933 A * | 1/1997 | Andersson ................... 297/408 |
| 5,681,079 A * | 10/1997 | Robinson ...................... 297/61 |
| 5,738,411 A | 4/1998 | Sutton et al. |
| 5,826,942 A | 10/1998 | Sutton et al. |
| 5,913,570 A | 6/1999 | Yoshida et al. |
| 6,024,405 A * | 2/2000 | MacAndrew et al. .. 297/216.12 |
| 6,045,181 A * | 4/2000 | Ikeda et al. ............ 297/216.12 |
| 6,050,633 A | 4/2000 | Droual |
| 6,074,011 A * | 6/2000 | Ptak et al. .................. 297/408 |
| 6,192,565 B1 | 2/2001 | Tame |
| 6,371,559 B1 | 4/2002 | Kienzle |
| 6,375,264 B1 | 4/2002 | Kienzle |
| 6,485,096 B1 * | 11/2002 | Azar et al. ..................... 297/61 |
| 6,499,805 B1 * | 12/2002 | Watadani ..................... 297/408 |
| 6,702,385 B2 * | 3/2004 | Holdampf et al. .......... 297/408 |

* cited by examiner

Primary Examiner—Peter M. Cuomo
Assistant Examiner—Sarah C. Burnham
(74) Attorney, Agent, or Firm—Warner Norcross & Judd LLP

(57) ABSTRACT

An articulating head restraint includes an armature with a cam. The cam has a lock acumination and a stop acumination. The armature fits within a structure composed of a bracket and a slave bracket. A slide, which is attached to a cable, rides within a slot on the bracket. When the slide is in the locked position, the lock acumination of the cam presses against the slide, restraining movement of the slide. When sufficient force is applied to the cable, the slide moves within the slot to an unlocked position. A torsion spring wrapped around the armature causes the armature to rotate to a stowed position.

19 Claims, 3 Drawing Sheets

HEAD RESTRAINT MECHANISM AND METHOD OF MAKING SAME

BACKGROUND OF THE INVENTION

This invention relates to vehicle head restraints.

Head restraints are an important safety feature of a vehicle seat. Although some head restraints are integral with the seat, most head restraints are attached to the top of the seat. If the head restraint is not integral with the seat, rods extend from the seat into the head restraint. These rods help maintain the position of the head restraint relative to the seat.

Articulating, or folding, head restraints are desirable. An articulating head restraint rotates from an upright position to a stowed position. An example of an articulating head restraint is shown in U.S. Pat. No. 5,738,411, issued to Sutton et al. In articulating head restraints, the relative position of the head restraint to the seat changes as the seat moves from the upright (design) position to the stowed position. The head restraint rotates forward or rearward so as to avoid contact with a preceding seat.

One problem with an articulating head restraint is the need to maintain its stability in the upright (design) position. Since the articulating head restraint has at least one joint, the head restraint will tend to move about the joint even in the design position.

Due to the greater number of moveable parts in an articulating head restraint, there is a greater likelihood that the head restraint will develop free play. "Free play" is an undesired and usually slight displacement of the head restraint from its design position. Free play is sometimes associated by consumers with a lack of sturdiness or quality. Minimization of free play is thus important.

Two sources of free play in an articulating head restraint are the locking mechanism and the rotational armature. The locking mechanism holds the head restraint in the upright position. If there is free play, the head restraint may tilt from the design position when the seat is unoccupied, an occupant of the seat could also feel some motion of the head restraint, or undesirable squeaks, or rattles could occur. In either circumstance, the head restraint could be considered to be poorly made and constructed.

An additional source of free play is due to the construction of the armature and bracket. One end of the armature is first placed through a first bracket hole. The other end was then placed through a second bracket hole. In order to facilitate the insertion of the second end of the armature into the bracket, the second bracket hole has a slightly larger diameter than the first bracket hole. Although a bushing is used, the armature thus tends to move laterally on its axis within the second bracket hole, again increasing the free play of the head restraint mechanism. Again, a consumer could infer that the head restraint was not well made.

Thus, articulating head restraints with minimal free play are very desirable.

SUMMARY OF THE INVENTION

The aforementioned problems are overcome in the present invention. An articulating head restraint with minimal free-play includes an armature. A pair of rods extending from the armature are configured to hold a bun.

A first end of the armature is inserted through a bracket hole. The second end of the armature is inserted through a hole in a slave bracket. The slave bracket is then attached to the bracket. Because the armature is inserted into the bracket and the slave bracket before the slave bracket is attached to the bracket, the diameter of the holes in both the bracket and the slave bracket can be near the size of the diameter of the armature, or even be made to accommodate a line to line fit condition. Thus, lateral movement of the armature within the bracket slave bracket is minimized.

Further, the articulating head restraint includes a torsion spring. A cam is positioned about the armature. The cam has a stop acumination and a lock acumination. The stop acumination and the lock acumination work in coordination with a slide. The slide moves laterally so as to become in contact with the lock acumination. The wedging action of the slide and lock acumination prohibit rotation of the armature.

A cable is attached to the slide. If a force is exerted on the cable, the slide will translate away from the lock acumination, allowing the cam to rotate, and thereby allowing the armature to rotate. The torsion spring causes the armature to rotate in a first direction. The stop acumination on the cam is positioned to prohibit excessive rotation of the armature in a second direction.

Because the cam, the acuminations on the cam, and the slide can be manufactured to a high degree of precision, the interaction of the lock acumination with the slide are exacting. Free play of the head restraint mechanism is thereby minimized, resulting in a solid feel and an ergonomically pleasing head restraint.

These and other objects, advantages and features of the invention will be more readily understood and appreciated by reference to the detailed description of the drawings.

DETAILED DESCRIPTION OF THE DRAWINGS

Figure 1:
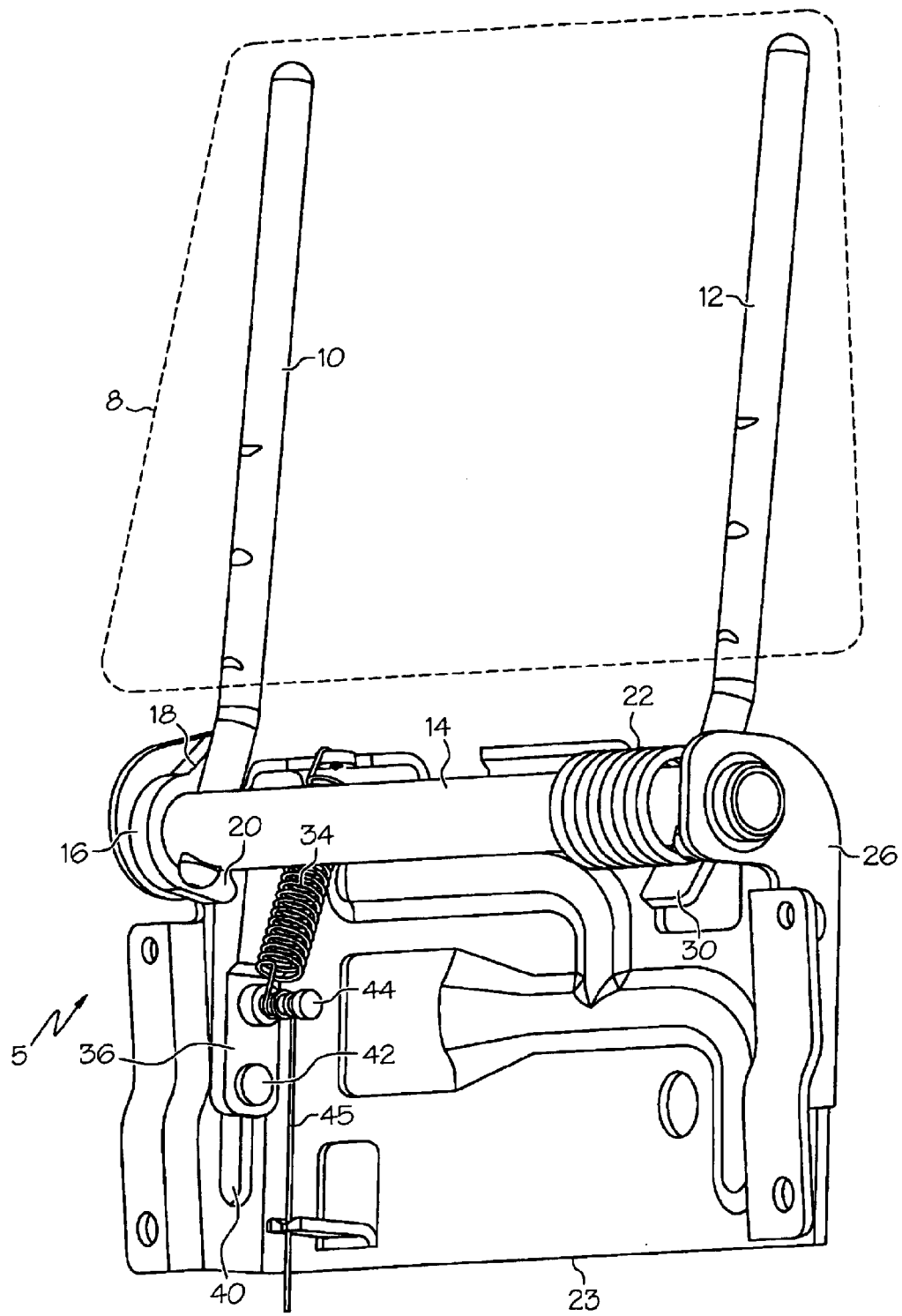
FIG. 1 is a view of an articulating head restraint mechanism.

FIG. 1 is a view of an articulating head restraint mechanism. A bun fits around first rod 10 and second rod 12. Rods 10, 12 are connected to armature 14. Armature 14 is rotatable. Cam 16 is connected to armature 14.

Cam 16 contains stop acumination 18 and lock acumination 20. Cam 16 is preferably constructed by a close tolerance processes from material suitable for the applied loads, providing cam 16 with a highly finished surfaces, especially the lock acumination 20.

Cam 16 is located on armature 14 and outside of first rod 10. Torsion spring 22 is circumferentially disposed about armature 14 and between first rod 10 and second rod 12 and near second rod 12.

Figure 2:
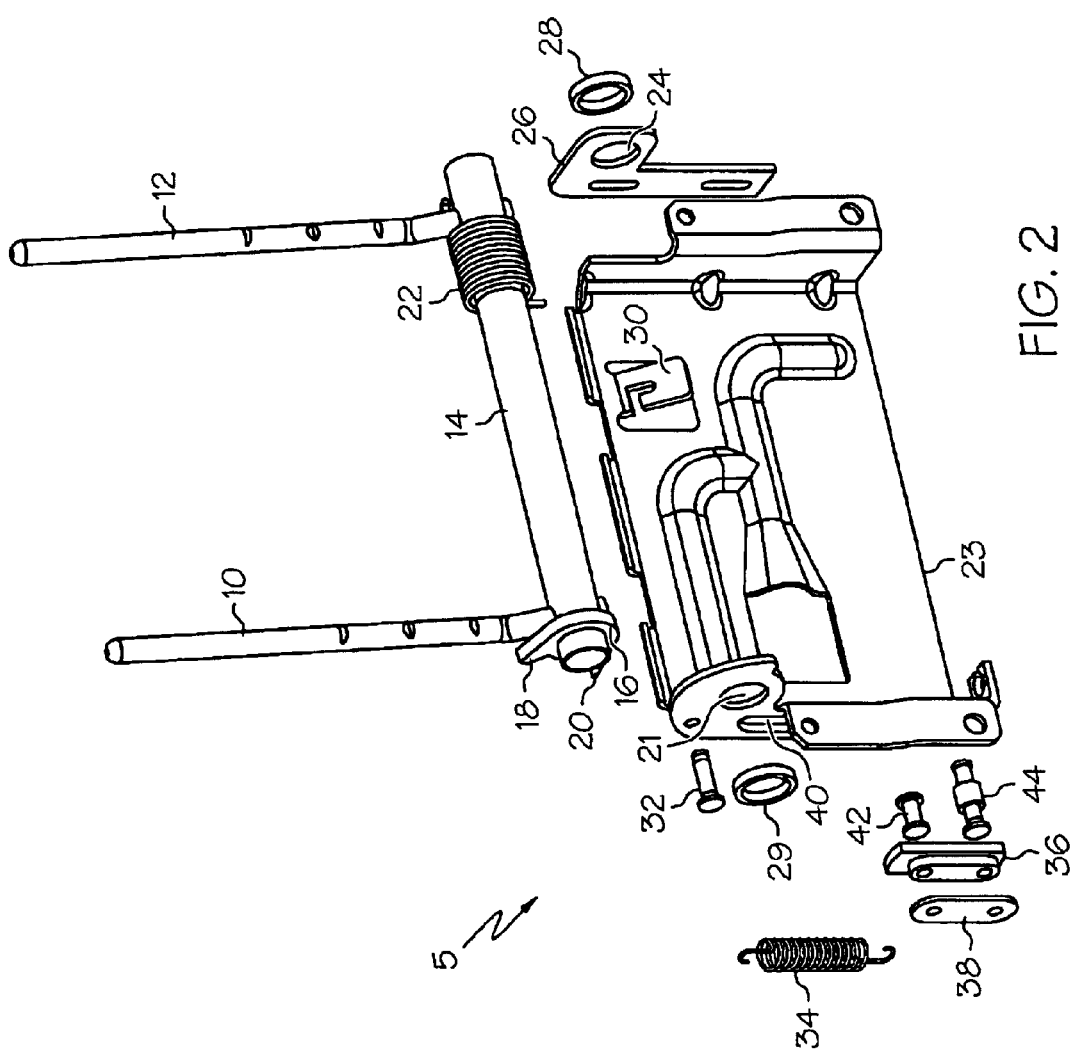
FIG. 2 is an exploded view of the articulating head restraint mechanism.

FIG. 2 is an exploded view of articulating head restraint mechanism 5.

One end of armature 14 fits within bracket hole 22 of bracket 23, while the other end of armature 14 fits within slave bracket hole 24 of slave bracket 26. First Teflon bearing 28 fits within slave bracket hole 24, while second Teflon bearing 29 fits within bracket hole 21.

Armature 14 is placed within bracket 23 by first aligning armature 14 with bracket hole 21 and inserting one end of armature 14 within bracket hole 21. The other end of armature 14 is placed within slave bracket hole 24. Slave bracket 26 is then affixed to bracket 23. In this manner, slave bracket hole 24 can have a diameter only slightly larger than the diameter of armature 14. Since Teflon bearing 28 fits within slave bracket hole 24 and Teflon bearing 29 fits within bracket hole 21, the free play of armature 14 is minimized, causing the head restraint to have a solid feel. When bearings are installed, the armature has a line-to-line fit with the pivot holes.

One end of torsion spring 22 is attached to tab 30 in bracket 23. The second end of torsion spring 22 is attached to second rod 12. Torsion spring 22 is configured so that it is wound as armature 14 is rotated toward the design position and unwound as armature 14 is rotated toward the stowed position.

Stop rivet 32 extends through bracket 23. Stop rivet 32 is positioned such that stop acumination 18 will firmly contact stop rivet 32 and prevent rotation of armature 14 beyond the design position.

One end of coil spring 34 is attached to cable rivet 44 while the other end of coil spring 34 is attached to bracket 23. Slot 40 extends within bracket 23. On the inside of bracket 23 and immediately proximal to slot 40 is slide 36. Slide 36 is attached to washer 38 by rivet 42 and cable rivet 44.

Cable rivet 44 is similar to rivet 42. However, cable rivet 44 is elongated so that slide coil spring 34 may be attached to cable rivet 44. Additionally, cable 45 is attached to cable rivet 44.

In an alternative embodiment, a second cam could be provided on the armature on the side opposite the previously described cam. A stop pin would be attached to the bracket. This would provide additional support to the head restraint when it was in the design position.

Figure 3:
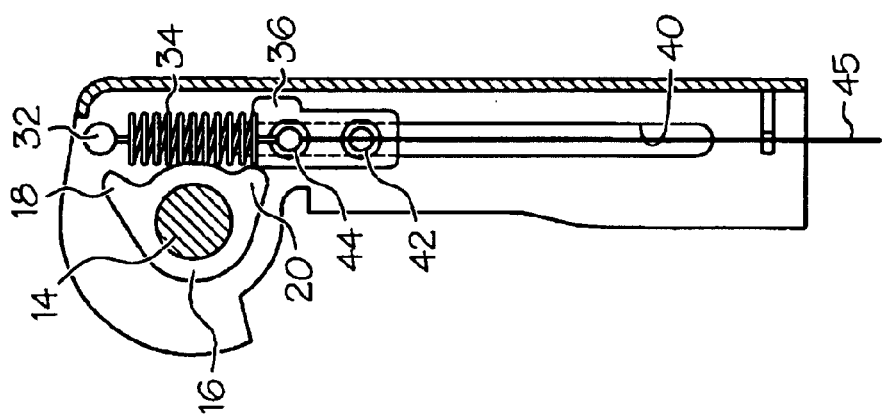
FIG. 3 is a side view of the locking mechanism of the articulating head restraint mechanism in the locked position.

FIG. 3 is a view of the locking mechanism of the head restraint 5 when head restraint 5 is in the design position. Slide 36 is at the top of slot 40 in the locked position. Lock acumination 20 of cam 16 pushes against slide 36. Torsion spring 22 is exerting a clockwise torque on armature 14, forcing lock acumination 20 into slide 36. The opposite side of slide 36 is thereupon forced into bracket 23. Lock acumination 20 and slide 36 are of such material and size so as to stop any movement of slide 36 absent any force on cable 45. Preferably, cam 16 and slide 36 are made from close tolerance processes out of material suitable for the applied loads. Slide 36 is approximately 5 mm to 10 mm wide. Lock acumination 20 is preferable of a width of about 5 mm to 10 mm.

As can be seen from FIG. 3, if armature 14 is rotated clockwise, stop acumination 18 will encounter stop rivet 32. Further rotation of armature 14 is thereby prohibited.

When sufficient force is exerted by cable 45 on slide 36, then slide 36 will translate in slot 40 until lock acumination is no longer above slide 36. At that time, torsion spring 22 will cause armature 14 to rotate so that rods 10, 12 assume the stowed position.

Figure 4:
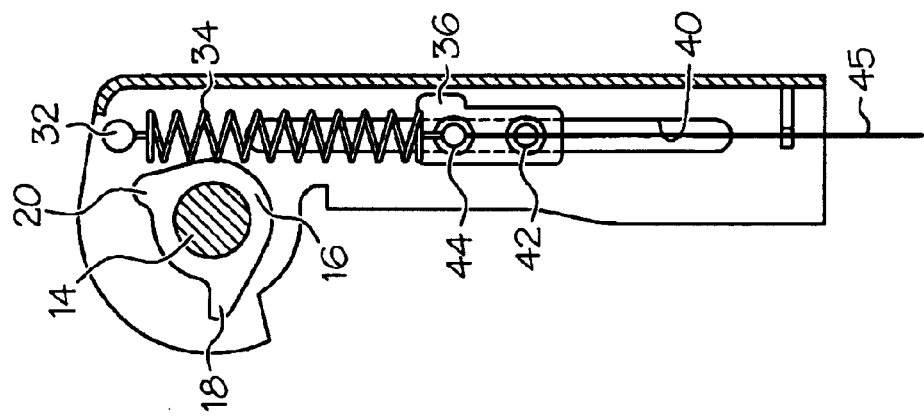
FIG. 4 is a side view of the locking mechanism of the articulating head restraint mechanism in the unlocked position.

FIG. 4 shows the head restraint mechanism in the stowed position. Cam 16 has rotated into the desired folded position. Slide 36 has moved down slot 40 into an unlocked position. At this time, coil spring 34 is exerting a force on slide 36 tending to return slide 36 to the locked position.

When the tension is reduced on cable 45, then slide 36 will translate upward to its former position. At that time, a force can be exerted on rods 10, 12 by a user or by some other mechanical means to return armature 14 to its locked position and the head restraint to its design position.

The use of the locking mechanism in the head restraint improves the overall feel of the head restraint. Additionally, due to the method of constructing the head restraint, there is very little lateral motion of the head restraint. The head restraint therefore has little free play. The lack of free play gives the head restraint a solid appearance and feel, thereby increasing the functionality and visual appeal of the head restraint.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

What is claimed is:

1. An articulating head restraint comprising:
   a bracket, the bracket having a slot; an armature contained within the bracket, the armature having a first armature end and a second armature end, and the first armature end resides within a bracket hole and the second armature end resides within a slave bracket hole;
   a cam having a lock acumination and a stop acumination, the cam fixedly attached to the armature;
   a slide attached to the bracket, the slide moveable within the slot to a locked position so that, when the slide is in the locked position, the lock acumination is in contact with the slide thereby preventing rotation of the armature, where the slide has an unlocked position such that when the slide is in the unlocked position, the lock acumination is not in contact with the slide;
   a torsion spring circumferentially disposed about the armature and configured so as to apply a torque on the armature tending to move the armature to a stowed position;
   at least one rod for attaching a bun;
   a coil spring attached to the bracket and to the slide and configured so as to tend to pull the slide to the locked position; and
   a cable attached to the slide and configured such that a force applied to the cable will tend to pull the slide to the unlocked position.

2. The articulating head restraint of claim 1 further comprising a tab located in the bracket, the tab configured so as to receive a first end of the torsion spring.

3. The articulating head restraint of claim 2 further comprising:
   a first rod attached to the armature;
   a second rod attached to the armature; and
   a second end of the torsion spring, the second end of the torsion spring attached to the second rod.

4. The articulating head restraint of claim 3 further comprising a first Teflon bearing located within the bracket hole and a second Teflon bearing located within the slave bracket hole.

5. The articulating head restraint of claim 4 further comprising a stop rivet attached to the bracket such that the stop acumination will strike the stop rivet to prevent rotation of the armature in a first direction.

6. The articulating head restraint of claim 5 where the coil spring is attached to the bracket.

7. The articulating head restraint of claim 6 further comprising a cable rivet, the coil spring attached to the slide by the cable rivet.

8. The articulating head restraint of claim 7 further comprising a cable attached to the cable rivet.

9. The articulating head restraint of claim 8 further comprising a washer, the washer attached to the slide.

10. The articulating head restraint of claim 9 further comprising a slave bracket, the slave bracket containing the slave bracket hole, the slave bracket fixedly attached to the bracket.

11. An articulating head restraint comprising:
   an armature having a first armature end and a second armature end;
   a torsion spring circumferentially disposed about the armature;
   a bracket, the bracket having a slot and a bracket hole;
   a slave bracket, the slave bracket having a slave bracket hole;
   a cam attached to the armature, the cam having a lock acumination and a stop acumination;
   a slide moveable within the slot from a locked position to an unlocked position, such that when the slide is in the locked position, the lock acumination is in contact with the slide such that the cam is prohibited from rotating, thereby preventing the armature from rotating;
   a coil spring, the coil spring tending to move the slide to the locked position;
   a cable, the cable attached to the slide such that when a force is applied to the cable, the slide tends to move to the unlocked position; and
   a stop rivet for prohibiting motion of the armature, and the stop acumination is arranged to contact the stop rivet to prohibit motion of the armature.

12. The articulating head restraint of claim 11 further comprising a tab, the tab connected to the bracket, the torsion spring having a first torsion spring end, where the first torsion spring end is attached to the tab.

13. The articulating head restraint of claim 12 further comprising a first rod and a second rod are attached to the armature, and the torsion spring is attached to the second rod.

14. An articulating vehicle head restraint comprising:
   a bracket;
   an armature contained within the bracket, the armature having a first end;
   a cam having a lock acumination, the cam fixedly attached to the armature;
   a moveable locking element for engagement with the lock acumination to prevent rotation of the armature,
   a torsion spring circumferentially disposed about the armature;
   a rod for attaching a bun, the rod directly attached to the armature; and
   a second spring attached to the bracket and to the moveable locking element for urging the moveable locking element into engagement with the lock acumination.

15. The articulating vehicle head restraint of claim 14 where the cam is proximal to the rod.

16. The articulating vehicle head restraint of claim 15 where the armature has a first end, and the cam is located between the first end and the torsion spring.

17. The articulating vehicle head restraint of claim 16 where the rod is located between the first end and the torsion spring.

18. The articulating vehicle head restraint of claim 17 further comprising a cable attached to the moveable locking element and configured such that a force applied to the cable will tend to disengage the moveable locking element from the lock acumination.

19. The articulating vehicle head restraint of claim 18 where the torsion spring is positioned proximal to the rod.

\* \* \* \* \*